No. 875,583. PATENTED DEC. 31, 1907.
H. D. JAMES.
METHOD OF CONTROL OF ELECTRIC MOTORS.
APPLICATION FILED MAY 6, 1907.

2 SHEETS—SHEET 2.

WITNESSES:
C. L. Belcher
Otto S. Schairer

INVENTOR.
Henry D. James
BY
Wesley G. Carr
ATTORNEY IN FACT.

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF CONTROL OF ELECTRIC MOTORS.

No. 875,583.   Specification of Letters Patent.   Patented Dec. 31, 1907.

Application filed May 6, 1907. Serial No. 372,138.

*To all whom it may concern:*

Be it known that I, HENRY D. JAMES, a citizen of the United States, and a resident of Pittsburg, in the county of Allegheny and State of Pennsylvania, have invented a new and useful Improvement in Methods of Control of Electric Motors, of which the following is a specification.

My invention relates to methods of controlling electric motors, and particularly to methods in which the motor armature is connected successively to circuits of different voltage.

The object of my invention is to provide a method of control whereby a motor may be suddenly disconnected from a circuit of high voltage and immediately connected to a circuit of low voltage, without causing injury thereto.

It is a common practice to effect speed variation of electric motors by connecting them successively to circuits of different voltage, resistance being usually inserted in series with the armature and gradually removed for each voltage step. In order that an excessive flow of current through the armature may be prevented when stepping from a low voltage to a high voltage, the voltage changes have heretofore been made without interrupting the armature circuit, this being done by connecting the motor armature in series with a resistance between the conductors of the high voltage circuit while the armature still remains connected to the low voltage circuit, and in then disconnecting the motor from the low voltage circuit. In the systems heretofore employed, however, the motor cannot be disconnected from the high voltage circuit when operating at a speed in excess of that which may be obtained upon the low voltage circuit, and re-connected to the low voltage circuit without danger of injuring the motor because the electromotive force generated by the motor may be in excess of that of the low voltage circuit.

Figure 1:
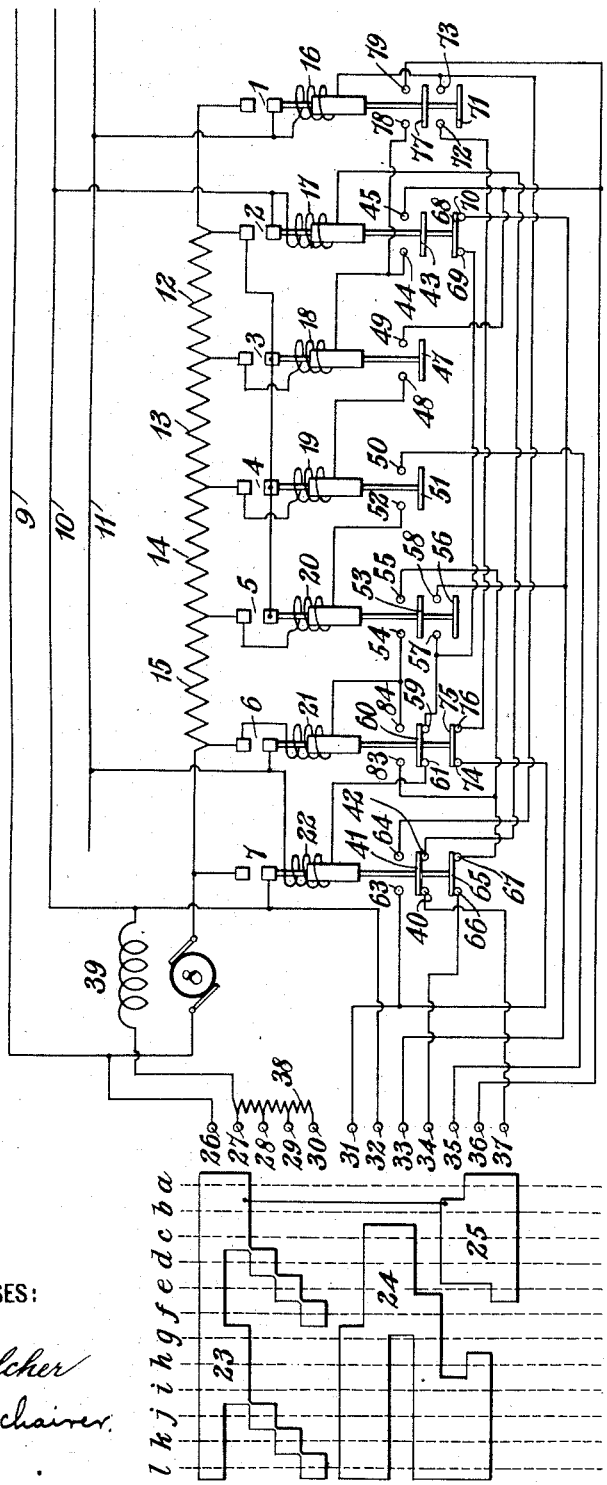
Figure 2:
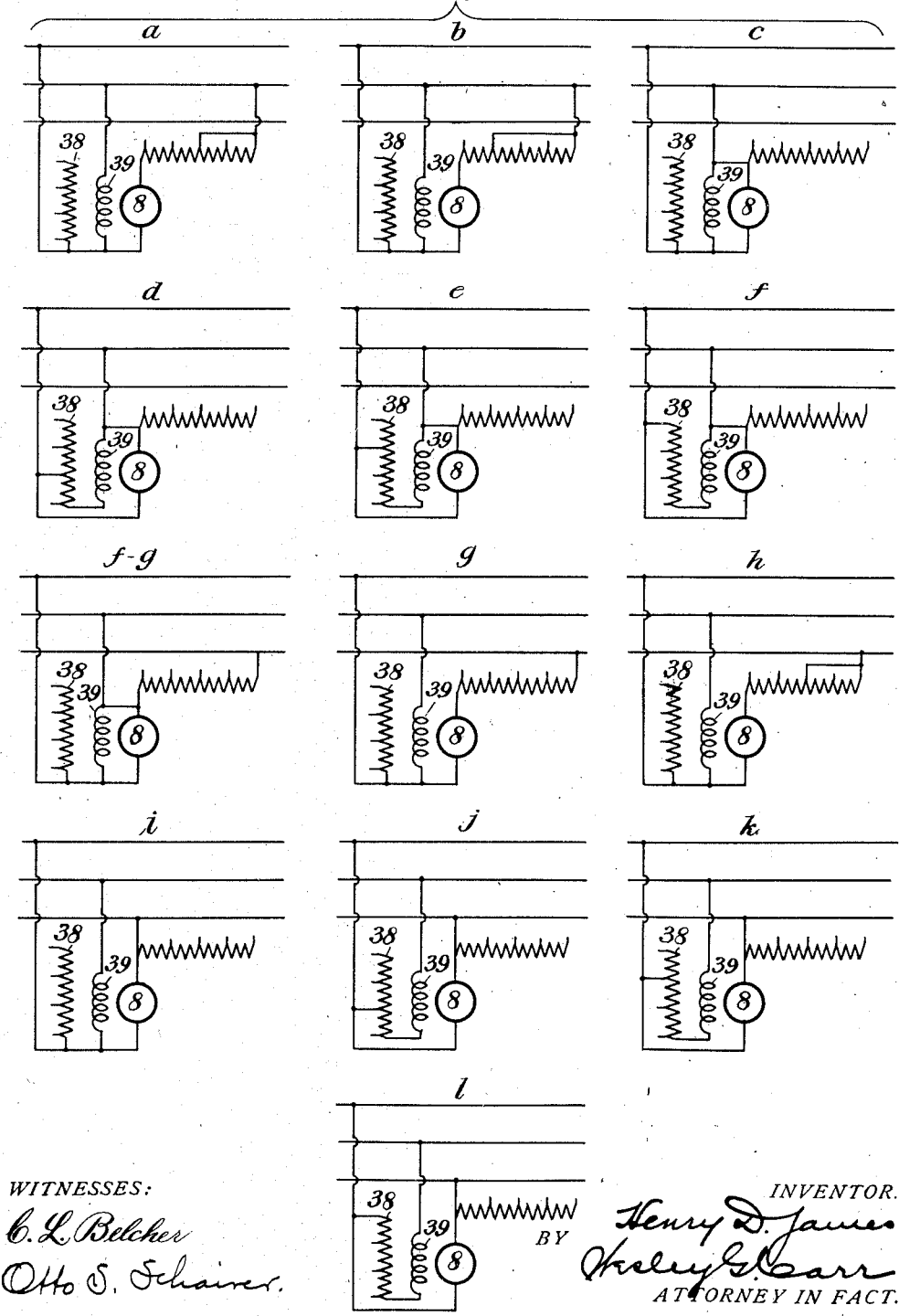

Figure 1 of the accompanying drawings is a diagrammatic view of a system of control in which my invention is practiced, and Fig. 2 illustrates, diagrammatically, the main circuit connections for each position of the controller.

The system comprises a plurality of separately actuated switches 1, 2, 3, 4, 5, 6 and 7 whereby a motor armature 8 may be connected to conductors 9, 10 and 11 of a multiple-voltage circuit and the amount of a resistance 12—13—14—15 in series with the motor armature may be governed. The switches 1 to 7, inclusive, are provided, respectively, with operating or controlling magnet windings 16, 17, 18, 19, 20, 21 and 22, corresponding terminals of the windings 18, 19, 20 and 21 being connected, respectively, to terminals of the resistance sections 12, 13, 14 and 15. The circuits of the magnet windings are governed automatically by means of interlocking switches that are associated with the switches 1 to 7, inclusive, and manually by means of a master controller, that comprises movable conducting segments 23, 24 and 25 and stationary contact terminals 26 to 37, inclusive, with which the conducting segments may be caused to engage along position-indicating lines *a* to *l*, inclusive. The movable segment 23 and the stationary terminals 27 to 30 of the master controller are provided for the purpose of governing the amount of a resistance 38 that is included in circuit with field magnet winding 39 of the motor.

The operation of the system may be best understood from a detailed description of the circuits corresponding to several of the positions of the master controller. When the master controller occupies the position *a*, a circuit is established by way of devices bearing reference characters 9, 26, 23, 27, 39 and 10, the field magnet winding 39 of the motor being thereby energized. Another circuit is also established by way of devices 9, 26, 23, 25, 37, 40, 41, 42, 17 and 10. Switch 2 then closes and connects the motor armature 8 in series with the resistance 12—13—14—15 between the low voltage circuit 9—10. When the switch 2 closes, a member 43 bridges terminals 44 and 45 and a circuit is thereby established through the devices 9, 26, 23, 25, 36, 45, 43, 44, 18, 12, 2 and 10. The magnet winding 18 will become sufficiently energized to effect the closure of the switch 3 when the counter electromotive force of the motor attains a predetermined value or the drop of potential in the resistance section 12 falls below a predetermined value. Another circuit will thereupon be established because of the raising of the bridging member 47 into engagement with terminals 48 and 49, the said circuit continuing from the terminal 36 through the devices 49, 47, 48, 19, 13, 3, 2 and 10. The magnet winding 19 will become sufficiently energized to effect closure of the switch 4 when the counter electromotive force of the motor attains a predetermined value. It will be seen that, when the switches 3 and 4 are closed, resistance sections 12 and 13 will be shunted successively, leaving only resistance sections 14 and 15 in series with the motor armature. When the master controller occupies the position b, another circuit is established through the devices 9, 26, 23, 25, 35, 50, 51, 52, 20, 14, 4, 2 and 10, the bridging member 51 having previously been caused to engage terminals 50 and 52, by reason of the closing of the switch 4. The switch 5 will, in turn, be closed as soon as magnet winding 20 becomes sufficiently energized on account of the increase of counter electromotive force of the motor, and resistance section 14 will be shunted from the circuit of the motor armature. The closing of the switch 5 moves the bridging member 53 into engagement with contact terminals 54 and 55 and also bridging member 56 into engagement with terminals 57 and 58.

When the master controller occupies the position c, a circuit is established through the devices 10, 32, 24, 33, 58, 56, 57, 59, 60, 61, 22 and 11, it being observed that the circuit is connected between the low voltage conductors 10 and 11, whereas the controlling magnet windings were previously connected between low voltage conductors 9 and 10. The magnet winding 22 then becomes energized to close the switch 7 and thereby connect the motor armature 8 directly between low voltage conductors 9 and 10 with no resistance in circuit. Movement of the switch 7 to closed position causes the bridging member 41 to be moved out of engagement with terminals 40 and 42 and into engagement with terminals 63 and 64, the bridging member 65 being also moved out of engagement with terminals 66 and 67. The position of the bridging member 65, when the switch 7 is closed, prevents energization of the magnet winding 21 of the switch 6. When the bridging member 41 is raised it interrupts the circuit of the magnet winding 17 and thus causes the switch 2 to open, the circuit of magnet winding 18 being also interrupted on account of the lowering of the bridging member 43. Switch 3 is thereby permitted to open and the circuit of magnet winding 19 is interrupted by the lowering of the bridging member 47. In like manner, the circuit of the magnet winding 20 is interrupted by the movement of the bridging member 51 when the switch 4 opens, and the switch 5 is thus caused to open. When the switch 2 opens, bridging member 68 engages contact terminals 69 and 70 so as to maintain the circuit of the magnet winding 22 independent of the interlocking switch 56—57—58, in order that opening of the switch 5 may not interrupt the same and cause opening of the switch 7, the said circuit, as maintained, being through devices 10, 32, 24, 33, 70, 68, 69, 59, 60, 61, 22 and 11.

As the master controller is moved through the succeeding positions d, e and f, gradually increasing amounts of the resistance 38 are included in the circuit of the field magnet winding 39, the armature circuit remaining undisturbed, although contact terminals 35, 36 and 37 become disengaged from the conducting segments 25, and contact terminal 34 engages conducting segment 24, because no new circuits are established through the controlling magnet windings of the switches. However, as the master controller is moved to the position g, conducting segment 24 is brought into engagement with contact terminal 31 and a circuit is thereby established through devices 10, 32, 24, 31, 63, 41, 64, 16 and 11, it being noted that, after said circuit is established, the contact terminal 33 becomes disengaged from the conducting segment 24 and the circuit of the magnet winding 22 is interrupted, the switch 7 being then permitted to open. The switch 1 is closed by the winding 16, when energized, and one terminal of the resistance section 12 is thereby connected to conductor 11. Thus, in passing from position f to position g of the master controller, the motor armature 8 is first connected between conductors 9 and 10, then the resistance 12—13—14—15 is connected between conductors 10 and 11, and finally the switch 7 opens to remove the common connection of the resistance and motor armature with conductor 10. When the switch 1 is closed, bridging member 71 is caused to engage terminals 72 and 73 and a circuit is established for the magnet winding 16 independently of the interlocking switch 63—41—64 through devices 31, 74, 75, 76, 72, 71 and 73. The bridging member 77 is also caused to engage terminals 78 and 79 when the switch 1 is closed and a circuit is established through devices 10, 32, 24, 36, 79, 77, 78, 18, 12, 1 and 11. The magnet winding 18 will become sufficiently energized to effect closure of the switch 3 when the drop of potential in the resistance section 12 decreases to a predetermined value, it being noted that the said winding is now connected between one terminal of the resistance section 12 and the conductor 10, whereas, when the motor armature was connected between conductors 9 and 10, the said winding was connected between one terminal of the resistance section 12 and the conductor 9. Thus, if the difference of potential between the conductors 9 and 10 and that between the conductors 10 and 11 are approximately the same, as will usually be the case, the voltages applied to the circuit of the winding 18 will be approximately the same whether the motor armature is connected to a high or to a low voltage circuit, and the magnet winding 18 will become sufficiently energized to effect closure of the switch 3 at the same current value or drop of potential in the resistance section 12 for both voltages that are applied to the armature circuit. Closing the switch 3 shunts the resistance section 12 and raises the bridging member 47 into engagement with contact terminals 48 and 49, thereby establishing a circuit from the contact terminal 36 through devices 49, 47, 48, 19, 13, 3, 1 and 11. When the drop of potential over the resistance section 13 decreases to a predetermined value the winding 19 will become sufficiently energized to effect closure of the switch 4, resistance section 13 being thereby shunted.

When the switch 4 closes, the bridging member 51 is raised into engagement with terminals 50 and 52, so that, if the master controller is then moved to the position i, a circuit will be established through devices 10, 32, 24, 35, 50, 51, 52, 20, 14, 4, 1 and 11, the switch 5 being closed to effect shunting of the resistance section 14 when the drop of potential over the resistance section 14 decreases to a predetermined value. Closing the switch 5 raises bridging member 53 into engagement with terminals 54 and 55, and a circuit is thereupon established through devices 10, 32, 24, 34, 66, 65, 67, 55, 53, 54, 21, 6, 15, 5, 1 and 11. The magnet winding 21 will become sufficiently energized to effect closure of the switch 6 when the drop of potential over the resistance section 15 decreases to a predetermined value, and bridging member 75 is thereupon raised out of engagement with terminals 74 and 76. The circuit of the magnet winding 16 of the switch 1 is thereby interrupted and the switch 1 opens. The switches 3, 4 and 5 also open in succession, leaving the motor armature connected directly between the conductors 9 and 11 by means of the switch 6. Upon closing the switch 6, bridging member 60 is raised out of engagement with terminals 59 and 61, energization of the magnet winding 22 of the switch 7 being thereby prevented while the switch 6 remains closed, and the member 60 is caused to engage contact terminals 83 and 84, a circuit being thereby established for the switch magnet 21 between the terminal 67 and the winding 21 independently of that previously established upon the closing of the switch 5 and subsequently interrupted upon the opening of the said switch by means of interlocking switch 53—54—55. The switch 6 alone remains closed through the succeeding positions j, k and l of the master controller, in moving through which positions the amount of the resistance 38 included in circuit with the field magnet winding 39 is adjusted.

When the motor armature is connected to the circuit 9—11, the counter electromotive force thereof will usually be greater than the electromotive force of the low voltage circuit 9—10 and serious injury may, consequently, be done the motor if the armature is suddenly disconnected from the high voltage circuit and immediately connected to the low voltage circuit without resistance in circuit therewith to absorb the difference between the voltages generated by the motor and that of the low voltage circuit. In the present system, changes in the armature voltage are effected without interrupting the armature circuit and without causing short-circuits, and when the motor armature is disconnected from the high voltage circuit and reconnected to the low voltage circuit, resistance is introduced in series therewith. This will be readily understood by supposing the master controller to be returned from the position g to the position d. In the position g, the switch 6 is alone closed, and also in the position f. Although, in the latter position, the segment 24 engages contact terminal 33, the circuit of the magnet winding 22 of the switch 7 is interrupted because bridging member 60 does not engage terminals 59 and 61. In passing from the position f to the position e, segment 25 is first caused to engage contact terminal 37 and a circuit is thereby established through devices 9, 26, 25, 36, 37, 40, 41, 42, 17 and 10. Energization of the magnet winding 17 causes the switch 2 to close and the resistance 12—13—14—15 is connected between the conductors 10 and 11. The segment 24 next becomes disengaged from contact terminal 34 and the circuit of magnet winding 21 of the switch 6 is interrupted, the switch 6 being thereby permitted to open, leaving the motor armature connected between conductors 9 and 10 with the resistance 12—13—14—15 in series therewith. If the master controller then occupies the position d, the switches 3, 4, 5, and 7 will close in succession, thereby removing the resistance 12—13—14—15 from the circuit of the motor armature, or, if the master controller occupies the position b, only switches 3, 4 and 5 will close. The motor will again accelerate to a speed corresponding to the position of the master controller. Thus it is seen that, in reducing the voltage applied to the armature circuit, the armature is first connected to the low-voltage circuit with the resistance in series therewith, and then it is disconnected from the high-voltage circuit, the resistance serving first to prevent short-circuiting of the supply circuit, and then to protect the motor from injury in case the electromotive force generated thereby exceeds that of the low-voltage circuit.

I claim as my invention:

1. The method of operating an electrical translating device which consists in connecting the same successively to supply circuits of decreasing voltage while still maintaining the circuit of the device, and in introducing resistance in series with the device between the same and the low-voltage supply circuit when effecting a reduction in voltage.

2. The method of operating an electrical translating device which consists in connecting the same to a circuit of high voltage, connecting the device to a circuit of lower voltage and in series with a resistance while still maintaining the connection of the device with the high voltage circuit, and breaking the said connection with the high voltage circuit.

3. The method of changing the connection of a translating device from a high voltage circuit to a circuit of lower voltage which consists in connecting a resistance between one conductor of the low voltage circuit and one terminal of the device, and breaking the connection of the said terminal with the high voltage circuit.

4. The method of operating an electrical translating device which consists in connecting the same to a high voltage conductor, connecting a resistance between the high voltage conductor and a lower voltage conductor and breaking the connection of the device and the resistance with the high voltage conductor.

In testimony whereof, I have hereunto subscribed my name this 29th day of April, 1907.

HENRY D. JAMES.

Witnesses:
   Ross W. Copeland,
   Birney Hines.